March 8, 1966 P. E. GOLDSBERRY 3,239,655

SINGLE CYCLE BINARY DIVIDER

Filed Aug. 21, 1964

INVENTOR.
PAUL E. GOLDSBERRY

BY John A. Brady

ATTORNEY.

United States Patent Office 3,239,655
Patented Mar. 8, 1966

3,239,655
SINGLE CYCLE BINARY DIVIDER
Paul E. Goldsberry, Lexington, Ky., assignor to International Business Machines Corporation, New York, N.Y., a corporation of New York
Filed Aug. 21, 1964, Ser. No. 391,175
9 Claims. (Cl. 235—164)

Figure 1:
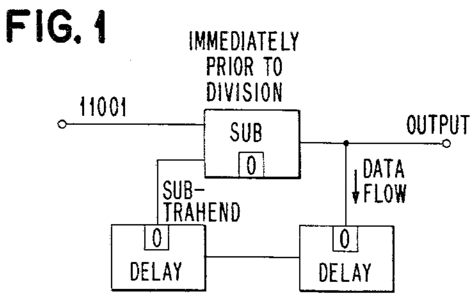

This invention relates to the automatic dividing of one number by another number. In particular this invention relates to the dividing of one number by a second number greater than one. The invention features a high speed structure capable of dividing by hitherto unwieldly divisors such as divisor 5.

Division has always been a serious and limiting problem in the automatic data processing art. One known method is to repetitively subtract the divisor from the dividend. The number of successful subtractions is counted, and the total represents the quotient. This method, however, may consume prohibitively long equipment time. For example, to divide 100,000 by 5; 20,000 subtractions are required. This basic scheme using repetitive subtraction may be modified and varied for a particular application, but seeming improvements impart new complications so that a high speed and efficient structure is not adequately realized when repetitive subtraction is the theoretical basis of the division scheme.

It is a fundamental feature of this invention that automatic dividing is accomplished by a scheme which is not theoretically based upon repetitive subtractions or a similar prohbitively large number of arithmetic operations.

This invention utilizes part of a not yet fully known quotient as a factor to be manipulated and subtracted from the dividend. Such an arrangement is not absolutely novel, but this invention also includes the coordination of data processing equipment with the basic division structures so that the result is one especially well suited to data processing applications.

The divisor of the division operation exists as an inherent relationship of the structure of this invention. Therefore, the invention provides means to obtain fractions without storage or retrieval of indications representative of the divisor. The structural reduction and simplicity obtained is apparent.

It is an object of this invention to create high speed dividing means.

It is an object of this invention to create high speed dividing means of great structural simplicity.

It is an object of this invention to provide a practical and truly useful automatic divider for data processing applications.

In accordance with this invention a dividend is presented as a specific code of the type in which each data location in a series represents a number of greater numeric value than all of the lower order numbers combined. A low order number of the quotient is predicted. This number is then multiplied by a factor less than the divisor and subtracted from dividend. Due to the code used (which, incidentally, is exemplified by the well known natural binary code) that stage acted upon by the subtraction is known to be a final, unique portion of the quotient. Thus, the result of the subtraction in each proper stage is observed as part of the quotient indication. Furthermore, the result of each subtraction, being recognized as part of the quotient, is operated upon by multiplying it by the factor less than the divisor and subsubtracting from the dividend in the manner just described. This process is continued until the entire dividend has been operated upon by each portion of the quotient multipled by the factor. Depending upon the divisor in a given operation, it may be necessary to predict a plurality of low order numbers of the quotient.

In accordance with certain aspects of the preferred embodiment of this invention, the quotient is presented in natural binary notation. The low order numbers of the quotient are observed since they are inherently identical with the low numbers of the quotient for division by an odd number. These low order numbers are displaced in position relative to the dividend. A subtraction from the dividend is carried out and the differences are observed as quotient values and also displaced in position and subtracted from the dividend. This is repeated until the entire dividend has been acted upon. The quotient is directly obtained in natural binary notation.

Further in accordance with this invention, it is recognized that certain numbers do not function properly with the basic division structures provided. Therefore, this invention includes also that the divider be operatively associated with data processing equipment adapted to modify the number as required and to receive the result immediately as the divider processes the number in a single cycle.

The foregoing objects, features, and advantages of the invention will be apparent from the following more particular description of a preferred embodiment of the invention, as illustrated in the accompanying drawings.

FIGS. 1, 2, 3, 4, 5, and 6 show the simple and efficient arrangement of the preferred embodiment and the steps to divide a natural binary number by 5.

*Theoretical basis*

It is important in understanding this invention to recognize that the invention is not based on repetitive subtraction of the divisor in the manner of the prior art. A subtraction is carried out, but at most only one subtraction is made for each natural binary ordinal. For example, to subtract 5 repetitively from 100,000 to obtain a quotient requires 20,000 subtractions. Yet, 100,000 is described in natural binary notation in less than twenty ordinals. In accordance with this invention the fraction will be obtained with less than twenty different subtractions.

A more detailed example of the terminology herein used may be helpful. The number 25 is described in natural binary notation by "Yes" or "No" indications in selected one of five ordinals as follows:

| Ordinal Value | 16 | 8 | 4 | 2 | 1 |
|---|---|---|---|---|---|
| Indications Describing 25 | Yes | Yes | No | No | Yes. |

The binary ordinals mentioned above are the ones representative of 1, 2, 4, 8, and 16. As is usual in this technology, the "Yes" "No" indications will generally be characterized by a "1" and a "0" respectively. Each ordinal invariably contains an indication so that the natural binary number 5 is described as 00101. In accordance with the invention, each ordinal location is operated upon by a subtraction no more than once. As will be made clear below, to fractionate by 5 in accordance with this preferred embodiment, the two low order ordinals (representing ordinals having values of 1 and 2) are not actually subtracted from, while the remaining ordinals are.

The theoretical basis of this invention relies upon the single subtraction of the proper number rather than the unwieldly repetitive subtraction of the divisor. As will become increasingly clear below, the subtraction in accordance with this invention is actually the subtraction of $X-Y \otimes X=(1-Y)X$, where $Y<1$. The quotient is immediately reached with but a single operation on each ordinal of the dividend. In the preferred embodiment the theoretical formula is $X-4X/5=X/5$. As will be clarified below, the general formula above described can be implemented in accordance with this invention only when at least one low ordinal of the quotient is known or somehow predicted and only when the quotient is multiplied by a factor which makes possible a definitive subtraction from the higher ordinals of the dividend. Furthermore, certain numbers must be modified as discussed below to prevent insuperable complications imposed by the possibility of infinite quotients. It should be borne in mind as these factors are discussed below that the object sought is to implement the general formula immediately above in a manner truly useful in data processing applications.

*Illustrative fractionating routine*

Even though much concerning this invention remains to be established and clarified, it may be best here to detail a complete fractionating operation. Further theoretical comments will be reserved until the actual steps involved have been clarified. It should be noted that this preferred embodiment provides means preselected to divide by 5. In this preferred structure the dividend must be evenly divisible by the divisor. This limitation will be fully discussed below under the heading "Prediction of Quotient Low Orders."

As a first example, the number 25, written in natural binary as 11001, will be considered. The operation is best understood with reference to the drawings. The natural binary code 11001 is presented to the subtractor serially, low order first as a minuend input. It should be understood that the subtractor is conventional in every respect, and that if a borrow is generated it is properly stored for use in a subtraction on a subsequent ordinal.

FIG. 1 is intended to symbolically illustrate the status of the circuit just prior to the first subtraction. Actually, the naturally binary bits would be stored in the bit register and presented to the subtractor serially, as suggested by the drawing, under the control of suitable gating means. The delay registers, illustrated by blocks in the drawings, would be timed also by gating means. These structures are omitted here since the serial processing of data under the control of suitable timing pulses is well understood in the art.

Figure 2:
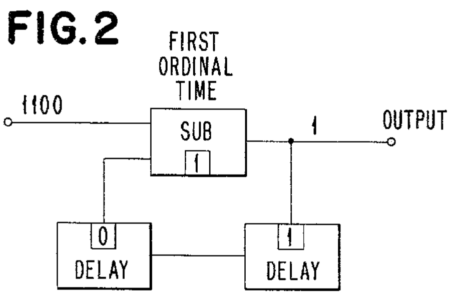

It will be noted that the two delay registers are set at "0" initially. Thus the first number to enter the subtractor, a binary "1" is acted upon by a subtrahend of "0." As illustrated in FIG. 2, binary "0" from "1" yields "1," which appears as the first ordinal of the output. It is simultaneously stored in the first delay register in the feedback loop shown. The zero stored in that delay register is shifted to the delay register connected to the subtrahend input.

Figure 3:
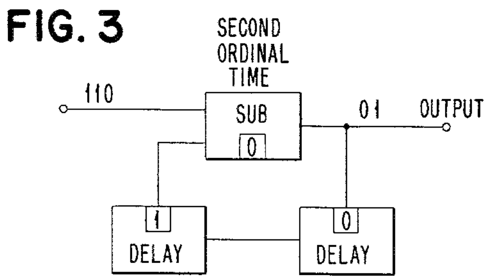

As illustrated by FIG. 2, at the next ordinal time the subtractor sees a minuend of "0" and a subtrahend of "0." The difference, of course, is "0," and this appears, as illustrated by the FIG. 3, at the output and simultaneously in the first delay register. The "1" previously at the first delay register has been shifted to the second delay register.

A minuend of "0" and a subtrahend of "1" now are at the input of the subtractor. The subtraction result, of course, is a "1" along with the storage of a borrow indication in the subtractor. The actual subtraction is no more than the usual subtraction of natural binary numbers. The output is once again shifted through the feedback loop. (See FIG. 4.)

Figure 4:
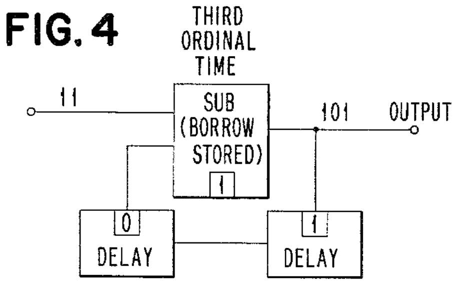
Figure 5:
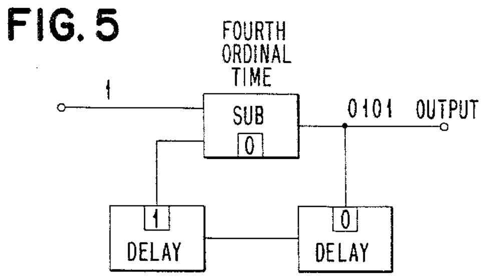
Figure 6:
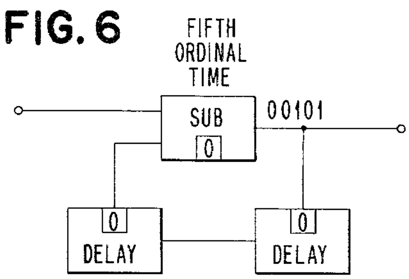

As shown in FIG. 4, a minuend of 1 and a subtrahend of "0" now are at the inputs. However, a borrow is stored in the subtractor. Therefore, at the fourth ordinal time (FIG. 5) the output is the usual subtraction result of "0." The shift once again occurs in the feedback loop.

At the fifth ordinal time a "1" and "1" are at the inputs, yielding a result of "0." After this subtraction (FIG. 6) the division is complete, and the circuit has automatically returned to its normal condition. The output has been (recited high order first) 00101, which is, of course, the natural binary notation of 5. This, of course, is the correct quotient. The number 25, properly divided by 5, produces the quotient of 5.

*Production of 4X/5*

Since the number X (25 in the example) was supplied to the minuend input of a subtractor and the number $X/5$ appeared as the output; it is undeniable that the number $4X/5$ must have been the subtrahend input. The following discussion is intended to show that this relationship holds true as a general rule.

(A) *Prediction of quotient low orders*

The preferred circuit shown is prearranged to subtract "0" from the first two low ordinals of the dividend. It is thus implied that in every case of a division of an evenly divisible number by five, the two low orders of a natural binary notation of the dividend are identical to the two low orders of the quotient. It will be shown here that this is inherent in the notation system used.

This inherent relationship may be proved by a consideration of the well known method of multiplying a binary number by five. The binary number 9, which is written as 1001, will be used as an example. As is well known, the natural binary number 1001 is multiplied by 2 with a single one ordinal shift in binary notation. Thus, $2 \otimes 1001$ is accomplished by the shift illustrated just following, usually in a one bit time delay circuit, $100\otimes 2=10010$. A second one ordinal shift again multiplies the number by 2, for a total multiplication of 4. Thus, 10010  2=100100. It becomes clear that a multiplication by 4 of any whole number moves any "1" digits completely out of the two low ordinals. A "0," of course, is properly inserted to indicate the absence of a "1." To accomplish the multiplication by 5 the original factor is added again.

Thus:

$$\begin{array}{rl} 100100 & (4\otimes 9) \\ +\ 1001 & (1\otimes 9) \\ 101101 & (5\otimes 9) \end{array}$$

Although the example number 9 was selected above, it will be recognized that a general relationship has been established. Multiplication of a natural binary number by 4 is always represented by the two ordinal position shift. Any "1" bits in the first two ordinals therefore are always removed and replaced by "0" indications. Multiplication by 5 is always represented by adding the original factor to the product of 4 times the factor. It is thus invariably true that the two low ordinals will be added to "0" indications, and that the two low ordinals will be identical in both the number and five times the number.

Although the above example showed that 5 times a number has the identical two low ordinals as the number, the original number is clearly a quotient from the division of 5 into the larger number. This is merely an example of mathematical reversibility. In other words, if one number is 5 times another number, and both numbers have identical two low ordinals, it follows from the definition of division that one-fifth of the larger number has the same two low ordinals as the larger number.

The above proof hinged upon the assumption that the original number to be multiplied was fully described by the lowest ordinal represented. A natural binary representation may be infinitely long, of course, with ordinal value patterns as follows:

$$2^{\infty} \ldots 8\ 4\ 2\ 1\ \tfrac{1}{2}\ \tfrac{1}{4}\ \tfrac{1}{8}\ \tfrac{1}{16}\ \tfrac{1}{32}\ \tfrac{1}{64} \ldots \tfrac{1}{2}^{\infty}$$

Should a binary "1" appear in any ordinal, a proper multiplication requires that ordinal and all greater ordinals to be included in the shift and in the addition.

This is merely a matter of proper and complete manipulation, and not a limitation on the proof. It remains inherently true that the first two significant low ordinals of the natural binary quotient of a natural binary number divided by 5 can be predicted as being identical to the low ordinals of the dividend. A serious manipulative problem does arise when the quotient is not known to be an integral number. In this case the fractional binary ordinals (such as ½, ¼, ⅛, etc.) occur in the formula, and the true binary number may be infinitely long. The term "evenly divisible" may have a number of meanings. However, reflection upon the above proof of low order quotient prediction shows that for the purposes of this invention a number is evenly divisible by the divisor used in the invention unless its quotient is infinitely long. An infinite number cannot be worked with directly in accordance with this invention because structure and time limit any practical system to within finite limits. Satisfactory approximations for particular purposes will be readily suggested, however, to those skilled in the art.

(B) *One utility*

The invention was developed for use with evenly divisible numbers and has one primary utility with such numbers. For example, in a radix conversion scheme I have invented solely and which is not claimed in this patent application, a natural binary number is converted to its decimal equivalent by weighing each binary ordinal containing a "1" according to its decimal equivalent in the units decimal ordinal. For example a binary 87 is

| 128 | 64 | 32 | 16 | 8 | 4 | 2 | 1 |
|---|---|---|---|---|---|---|---|
| 0 | 1 | 0 | 1 | 0 | 1 | 1 | 1 |

For conversion to the units decimal the binary ordinal 128 has a weight of 8. It is ignored, however, because a "0" appears in that ordinal. The ordinal representing 64 has a weight 4, and is considered because a "1" appears in that ordinal. The 32 ordinal has a weight 2, but is not considered because a "0" appears in the binary 32 ordinal. The 16 ordinal has a weight 6, which is considered; the 8 is ignored because of the "0" indication. The weights 4, 2, and 1 are considered because "1" appears in the binary number. The weights are summed, i.e. 4+6+4+2+1=17 and any carry is ignored. At 7 is thus found which invariably represents the decimal digit in the units decimal ordinal.

Further, in accordance with my radix conversion scheme, the value 7 is then subtracted, in natural binary notation, from the natural binary number 87. The number 80 results. Upon reflection, it should be clear that a number evenly divisible by 10 (and hence by 5) invariably results. The fractionating scheme of this invention can be used directly on the natural binary number 80 with great economy and at high speed. A one bit shift is inserted in the quotient to convert a division by 5 to a division by 10. The natural binary number 8 results, which appears as 1000. The ordinals carrying a "1" can be weighted and summed as previously.

Although in the above simplified example the improvements of the total radix conversion invention are slight, it should be clear that the improvements are substantial when a large binary number is acted upon. The decimal equivalents of a natural binary number are only four in number (8, 4, 2, 6—ignoring only the equivalent 1 for the lowest ordinal). The equivalents (8, 4, 2, 6) reoccur in order repeatedly as viewed from high binary ordinal to low binary ordinal or vice versa. It is necessary in the conversion scheme to provide only a minimum of structure to carry out the reoccurring additions required. The subtraction and then high speed division in accordance with this invention regenerates a number which can once again be converted to decimal notation by the same reoccurring pattern of equivalents, which are added in the same way. Thus, the simplified structure provided for the conversion to the decimal units ordinal can be used once again for the converison to each of any number of higher decimal ordinals.

(C) *Utility—Approximations*

It has been suggested to me that satisfactory approximations should be available so that this invention can be used as one of general applicability. It must be recognized however that the existence of "0" indications in all low ordinals beyond a given ordinal in a dividend does not generally mean that those low ordinals can be ignored. The binary ordinals ½, ¼, ⅛, etc. could be ignored in the above application with the radix conversion scheme described only because it was known that quotient was integral.

In a more general application, however, it should be assumed that "1" might appear in the fractional binary ordinals of the quotient. Thus, the first ordinal computed should be one well within the limits of accuracy desired. This might be, for example, the binary ordinal representative of 1/128. To negate the possibility of a quotient of infinite numeric length, an evenly divisible number approximating the dividen could be used. Thus, the binary 7 is correctly written:

Ordinal Value

| 8 | 4 | 2 | 1 |
|---|---|---|---|
| 0 | 1 | 1 | 1 |

It is also correctly written:

| O.V. | 8 | 4 | 2 | 1 | ½ | ¼ | ⅛ | 1/16 | 1/32 | 1/64 | 1/128 . . . | $½^\infty$ |
|---|---|---|---|---|---|---|---|---|---|---|---|---|
| | 0 | 1 | 1 | 0 | 1 | 1 | 1 | 1 | 1 | 1 | 1 . . . | 1 |

A notation approximating 7 by "1" indications in all fraction columns up to 1/128 is evenly divisible. Such an approximation will function perfectly with my invention. On the other hand, a notation approximating 7 by "1" indications in all fraction columns up to 1/64 is not evenly divisible and would be an unsatisfactory approximation for use with my invention.

In the preceding description the drawings were used along with a detailed description of the steps involved to illustrate the division of 25 by 5. The division of a properly approximated seven by five will be described in a more compact manner, it being understood that the details discussed in connection with the drawing are also generally applicable, but are omitted to avoid redundancy. Although a pencil and paper representation is shown, it will be recognized that a conventional subtraction is carried out and that the arrows shown below indicate the movement of numbers entirely comparable to that illustrated in the drawings.

| Binary Ordinal Val. | 8 | 4 | 2 | 1 | 1/2 | 1/4 | 1/8 | 1/16 | 1/32 | 1/64 | 1/128 |
|---|---|---|---|---|---|---|---|---|---|---|---|
| Binary 7 (approx.) | 0 | 1 | 1 | 0 | 1 | 1 | 1 | 1 | 1 | 1 | 1 |

FRACTIONATING IN ACCORDANCE WITH THE INVENTION

| | | | | | | | | | | | |
|---|---|---|---|---|---|---|---|---|---|---|---|
| Binary 7 (approx.) | 0 | 1 | 1 | 0 | 1 | 1 | 1 | 1 | 1 | 1 | 1 |
| SUBTRAHEND | 0 | 1 | 0 | 1 | 1 | 0 | 0 | 1 | 1 | 0 | 0 |
| (By Low Order Prediction AND 2 Ordinal Shift | 0 | 0 | 0 | 1 | 0 | 1 | 1 | 0 | 0 | 1 | 1 |

Predicted

The number produced represents $$1+\frac{1}{4}+\frac{1}{8}+\frac{1}{64}+\frac{1}{128}=1+0.25+0.125+0.0156+0.0078=1.3984$$

This is, of course, a close approximation to the true result or $\frac{7}{5}=1.4$. Further accuracy could be obtained by increasing the number of low binary ordinals used. It should also be clear that it is a simple matter to the art to insert "1" indications in all low orders entering the subtraction means until a "1" indication is actually observed in a given ordinal. The first observed "1" would be suppressed, and the remaining ordinals then passed the same as they appear. When using an approximation as herein described the low ordinal digits of a quotient are approximately predicted with completely sufficent accuracy.

The above discussion of approximations is not intended as definitive nor is it claimed to be an invention made by me. It is included, however, to illustrate the possibilities and general utility upon which my invention is the foundation.

*Capitulation and terminology*

My division scheme is thus seen to depend upon subtle inter-relationships which are none the less mathematically accurate and therefore capable of wide and various modifications. As I have demonstrated, the low ordinal values of the dividend can be used alone to predict with sufficient accuracy the low ordinal values of the quotient. Other methods of prediction are, of course, possible. This part of the quotient is then used to operate upon the dividend. Substantial economies result from the continuous generation of further information concerning the quotient.

Regardless of how the prediction is made, the multiplication and subtraction then proceeds to the proper conclusion. The known portion of the quotient must be multiplied by some factor less than the divisor for subsequent subtraction from the dividend. If the dividend is in some progressive scheme of notation, the subtraction of part of the quotient can yield new, definitive information concerning quotient, and the previous step can be repeated with the new information concerning the quotient. A progressive repetition is established which ultimately defines each and every ordinal of the quotient.

The term "progressive scheme of notation" is meant to describe a scheme in which the various code indications have independent numeric significance such that they can be subtracted from at each ordinal to produce a coded numeric result which will appear in the difference regardless of further subtractions of ordinals indicative of larger numbers. The natural binary code discussed in detail above, of course, meets this definition. If a "1" or "0," for example, is subtracted from a natural binary number at the 4 ordinal, a result is produced in the difference output which is unchanged by subtractions from the 8 or higher order ordinals.

Furthermore, it is clear that each quotient ordinal must be multiplied to a value represented exclusively by a dividend ordinal. The natural binary system, of course, easily adapts to this limitation. For example, a "1" in the 2 ordinal when multiplied by 4 produces a "1" in the 8 ordinal of the subtrahend input to the subtractor. The product is thus equal in valve or corresponds to one ordinal of the minuend, since a "1" in any other quotient ordinal does not multiply by 4 to any value which should appear in the 8 ordinal of the subtrahend input.

Finally, it should be noted that the fraction obtained depends upon an inter-relationship of the original orders of the quotient predicted and the multiplication factor with which the quotient is operated upon. In the preferred embodiment the predicted ordinals of the quotient were indicative of $X/5$. Multiplication by shifting ordinals, of course, is equal to a multiplication by 2 to the power of the number of ordinals shifted. Thus, in the preferred embodiment $X/5$ was multiplied by 4 (by a two ordinal shift) to yield $4X/5$. As long as the factors and numerical systems used satisfy the exclusivity requirement just discussed, each output of the subtractor yields new, definitive information concerning the quotient. It should be clear that other predicted ordinals and other factors in the quotient can function equally well. Once a repeating output is established which can be multiplied with the proper exclusivity, a proper quotient results directly from the basic theory of this invention.

Modifications and adaptations for special purposes are immediately suggested. An evenly divisible number in natural binary notation is divided by three by simply modifying the preferred embodiment shown so that a single ordinal delay exists in the feedback path from the output of the subtractor to the subtrahend input of the subtractor. An evenly divisible binary coded decimal number is divided by eleven by a one ordinal delay and appropriate recognition that each ordinal is presented in a parallel scheme of notation.

While the invention has been particularly shown and described with reference to a preferred embodiment thereof, it will be understood by those skilled in the art that various changes in form and details may be made therein without departing from the spirit and scope of the invention.

I claim:

1. A divider for dividing a dividend in a single cycle comprising:

means to subtract at least two numbers, means to insert at least some ordinals of a code representative of a dividend in said means to subtract as a minuend input, serially, low order first; said code being in a progressive scheme of notation, said dividend being represented only once in full ordinal form in said cycle, means to insert at least one condition representative of a numeric value in said means to subtract as a subtrahend input for subtraction from a low order of said dividend, means to multiply the output of said means to subtract by a factor such that the product is of a value exclusive to that represented by a dividend ordinal, and to insert the product in said means to subtract as a subtrahend input to subtract each said multiplied output from the corresponding ordinals of said dividend, said divider being characterized by being constructed and adapted to receive serial data and to generate a final result including low ordinal data indications in a cycle consisting of only a single cycle as above described, said divider further being characterized by being constructed, adapted, and operatively connected to data processing equipment which is constructed and adapted to both modify data as required for use with said divider and to receive said final result, including said low ordinal data indications, for data processing without modification having to do with said divider.

2. A divider for dividing a dividend in a single cycle comprising:

means to subtract at least two numbers, means to insert at least some ordinals of a code represenative of a dividend in said means to subtract as a minuend input, serially, low order first; said code being in a progressive scheme of notation, said dividend being represented only once in full ordinal form in said cycle, means to predict a multiple of at least an approximation of at least one low order of the quotient of said dividend and a predetermined divisor, said multiple being by a factor such that the product is of a value exclusive to that represented by a dividend ordinal, means to insert said predicted multiple in said means to subtract as a subtrahend input to subtract at least one said predicted multiple from the ordinal of said dividend, means to multiply the output of said means to subtract by a factor such that the product is of a value exclusive to that represented by a dividend ordinal, and to insert the product in said means to subtract as a subtrahend input to subtract each said multiplied output from the corresponding ordinals of said dividend, said divider being characterized by being constructed and adapted to receive serial data and to generate a final result including low ordinal data indications in a cycle consisting of only a single cycle as above described, said divider further being characterized by being constructed, adapted, and operatively connected to data processing equipment which is constructed and adapted to both modify data as required for use with said divider and to receive said final result, including said low ordinal data indications, for data processing without modification having to do with said divider.

3. A divider for dividing a dividend in a single cycle comprising:

means to subtract at least two numbers, means to insert at least some ordinals of a code representative of a dividend in said means to subtract as a minuend input, serially, low order first, said code being in a progressive scheme of notation, said dividend being presented only once in full ordinal form in said cycle, means to predict at least an approximation of at least one low order of the quotient of said dividend and a predetermined divisor, means to multiply said predicted low order of the quotient by a factor such that each product is of a value exclusive to that represented by a dividend ordinal, means to insert said multiplied, predicted low order in said means to subtract as a subtrahend input to subtract at least one said multiplied, predicted low order from the corresponding ordinal of said dividend, means to multiply the output of said means to subtract by a factor such that the product is of a value exclusive to that represented by a dividend ordinal, and to insert the product in said means to subtract as a subtrahend input to subtract each said multiplied output from the corresponding ordinals of said dividend, said divider being characterized by being constructed and adapted to receive serial data and to generate a final result including low ordinal data indications in a cycle consisting of only a single cycle as above described, said divider further being characterized by being constructed, adapted, and operatively connected to data processing equipment which is constructed and adapted to both modify data as required for use with said divider and to receive said final result, including said low ordinal data indications, for data processing without modification having to do with said divider.

4. A divider for dividing a dividend in a single cycle comprising:

means to subtract at least two natural binary numbers, means to insert at least some ordinals of a natural binary code representative of a dividend in said means to subtract as a minuend input, serially, low order first, said dividend being represented only once in full ordinal form in said cycle, means to insert at least one condition representative of a binary value in said means to subtract as a subtrahend input for subtraction from a low order of said dividend, means to multiply the output of said means to subtract by a power of two and to insert the product in said means to subtract as a subtrahend input to subtract each said multiplied output from the corresponding ordinals of said dividend, said divider being characterized by being constructed and adapted to receive serial data and to generate a final result including low ordinal data indications in a cycle consisting of only a single cycle as above described, said divider further being characterized by being constructed, adapted, and operatively connected to data processing equipment which is constructed and adapted to both modify data as required for use with said divider and to receive said final result, including said low ordinal data indications, for data processing without modification having to do with said divider.

5. A divider for dividing a dividend in a single cycle comprising:

means to subtract at least two natural binary numbers, means to insert at least some ordinals of a natural binary code representative of a dividend in said means to subtract as a minuend input, serially, low order first, said dividend being represented only once in full ordinal form in said cycle, means to predict a multiple of at least an approximation of at least one low order of the quotient of said dividend and a predetermined divisor, said multiple being by a power of two, means to insert said predicted multiple in said means to subtract as a subtrahend input to subtract at least one said predicted multiple from the corresponding ordinal of said dividend, means to multiply the output of said means to subtract by the same said power of two and to insert the product in said means to subtract as a subtrahend input to subtract each said multiplied output from the corresponding ordinals of said dividend, said divider being characterized by being constructed and adapted to receive serial data and to generate a final result including low ordinal data indications in a cycle consisting of only a single cycle as above described, said divider further being characterized by being constructed, adapted, and operatively connected to data processing equipment which is constructed and adapted to both modify data as required for use with said divider and to receive said final result, including said low ordinal data indications, for data processing without modification having to do with said divider.

6. A divider for dividing a dividend in a single cycle comprising:

means to subtract at least two natural binary numbers, means to insert at least some ordinals of a natural binary code representative of a dividend in said means to subtract as a minuend input, serially, low order first, said dividend being represented only once in full ordinal form in said cycle, means to predict at least an approximation of at least one low order of the quotient of said dividend and a predetermined divisor, means to multiply said predicted low order of the quotient by a power of two, means to insert said multiplied, predicted low order in said means to subtract as a subtrahend input to subtract at least one said multiplied, predicted low order from the corresponding ordinal of said dividend, means to multiply the output of said means to subtract by the same said power of two and to insert the product in said means to subtract as a subtrahend input to subtract each said multiplied output from the corresponding ordinals of said dividend, said divider being characterized by being constructed and adapted to receive serial data and to generate a final result including low ordinal data indications in a cycle consisting of only a single cycle as above described, said divider further being characterized by being constructed, adapted, and operatively connected to data processing equipment which is constructed and adapted to both modify data as required for use with said divider and to receive said final result, including said low ordinal data indications, for data processing without modification having to do with said divider.

7. A divider for dividing a dividend in a single cycle comprising:

means to subtract at least two natural binary numbers, means to insert at least some ordinals of a natural binary code representative of a dividend in said means to subtract as a minuend input, serially, low order first, said dividend being represented only once in full ordinal form in said cycle, means to observe the output of said means to subtract for at least one low ordinal of said dividend and to insert said observed ordinal in said means to subtract as a subtrahend input to subtract said observed ordinal from a higher ordinal of said dividend, means to insert the output of said means to subtract in said means to subtract as a subtrahend input to subtract said output from an ordinal of said dividend higher by the same number of ordinals as the difference between said observed ordinal and the ordinal from which said observed ordinal was subtracted, said divider being characterized by being constructed and adapted to receive serial data and to generate a final result including low ordinal data indications in a cycle consisting of only a single cycle as above described, said divider further being characterized by being constructed, adapted, and operatively connected to data processing equipment which is constructed and adapted to both modify data as required for use with said divider and to receive said final result, including said low ordinal data indications, for data processing without modification having to do with said divider.

8. A divider for dividing a dividend in a single cycle comprising:

means to subtract at least two natural binary numbers, means to insert at least some ordinals of a natural binary code representative of a dividend in said means to subtract as a minuend input, serially, low order first, said dividend being represented only once in full ordinal form in said cycle, means to observe the output of said means to subtract for a plurality of adjacent low order values of said dividend and to insert said observed low order values in said means to subtract as a subtrahend input to individually subtract said observed ordinals from individual ordinals of said dividend, the observed ordinals of increasing ordinal value being subtracted from individual dividend ordinals of increasing ordinal value beginning with the next adjacent higher ordinal in said dividend to said ordinals observed, means to insert the output of said means to subtract in said means to subtract as a subtrahend input to subtract said output from an ordinal of said dividend higher by the same number of said ordinals observed than each dividend ordinal which produced each said output of said means to subtract, said divider being characterized by being constructed and adapted to receive serial data and to generate a final result including low ordinal data indications in a cycle consisting of only a single cycle as above described, said divider further being characterized by being constructed, adapted, and operatively connected to data processing equipment which is constructed and adapted to both modify data as required for use with said divider and to receive said final result, including said low ordinal data indications, for data processing without modification having to do with said divider.

9. A factor of five divider for dividing a natural binary number in a single cycle comprising:

a serially operable subtractor, means to serially insert a natural binary number to said subtractor as a minuend input, low order first, said natural binary number being represented only once in full ordinal form in said cycle, means to delay the output of said subtractor two bit times of said serially inserted, natural binary number, means connecting the output of said delay means to the input of said subtractor as a subtrahend input, said connection normally representing a binary zero, said divider being characterized by being constructed and adapted to receive serial data and to generate a final result including low ordinal data indications in a cycle consisting of only a single cycle as above described, said divider further being characterized by being constructed, adapted, and operatively connected to data processing equipment which is constructed and adapted to both modify data as required for use with said divider and to receive said final result, including said low ordinal data indications, for data processing as the quotient of said minuend input divided by five without modification having to do with said divider.

References Cited by the Examiner

UNITED STATES PATENTS

| | | | |
|---|---|---|---|
| 3,018,047 | 1/1962 | La Manna | 235—165 |
| 3,039,691 | 6/1962 | Fleming | 235—165 |
| 3,059,851 | 10/1962 | Robinson | 235—165 |
| 3,155,820 | 11/1964 | Broadhead | 235—165 |

ROBERT C. BAILEY, *Primary Examiner.*

M. LISS, *Assistant Examiner.*